(12) United States Patent
Lupper et al.

(10) Patent No.: US 12,136,974 B2
(45) Date of Patent: Nov. 5, 2024

(54) CLOUD NETWORK IMPLEMENTATION FOR A DISTRIBUTED ANTENNA SYSTEM CONTROL PLANE

(71) Applicant: Outdoor Wireless Networks LLC, Claremont, NC (US)

(72) Inventors: Alfred Josef Lupper, Aystetten (DE); Arndt Paul Pischke, Huisheim (DE); Klaus Rosenschild, Donauwörth (DE)

(73) Assignee: Outdoor Wireless Networks LLC, Claremont, NC (US)

( * ) Notice: Subject to any disclaimer, the term of this patent is extended or adjusted under 35 U.S.C. 154(b) by 706 days.

(21) Appl. No.: 17/196,507

(22) Filed: Mar. 9, 2021

(65) Prior Publication Data

US 2021/0218447 A1     Jul. 15, 2021

Related U.S. Application Data

(62) Division of application No. 16/256,765, filed on Jan. 24, 2019, now Pat. No. 10,979,114.

(Continued)

(51) Int. Cl.
*H04B 7/06* (2006.01)
*G06F 9/455* (2018.01)
(Continued)

(52) U.S. Cl.
CPC ....... *H04B 7/0608* (2013.01); *G06F 9/45558* (2013.01); *H04B 7/024* (2013.01);
(Continued)

(58) Field of Classification Search
CPC ... H04B 7/0608; H04B 7/024; G06F 9/45558; H04L 41/069; H04W 80/08; H04W 88/085; H04W 88/12
See application file for complete search history.

(56) References Cited

U.S. PATENT DOCUMENTS

2007/0274279 A1   11/2007   Wood et al.
2008/0199183 A1   8/2008    Liu et al.
(Continued)

FOREIGN PATENT DOCUMENTS

EP           2719138 B1     5/2020
WO     2017210186 A1    12/2017

OTHER PUBLICATIONS

European Patent Office, "Extended European Search Report from EP Application No. 19744213.0", from Foreign Counterpart to U.S. Appl. No. 16/256,765, Aug. 31, 2021, pp. 1 through 21, Published: EP.

(Continued)

*Primary Examiner* — Redentor Pasia
(74) *Attorney, Agent, or Firm* — Fogg & Powers LLC

(57) ABSTRACT

Cloud network implementations for a distributed antenna system (DAS) control plane are provided. In one embodiment, a DAS architecture comprises: a DAS cloud computing network; a first DAS comprising a first user plane, wherein the first user plane includes uplink circuitry and downlink circuitry, wherein the uplink circuitry forwards uplink radio frequency traffic from at least one remote antenna unit to a master unit, wherein the downlink circuitry forwards downlink radio frequency traffic from the master unit to the at least one remote antenna unit; wherein the DAS cloud computing network comprises a control plane in communication with the user plane through a network; the first user plane comprises a high level protocol interface abstraction layer coupled to the network and processes and forwards the uplink and downlink radio frequency traffic based on configuration commands received from the control plane via the high level protocol interface abstraction layer.

25 Claims, 6 Drawing Sheets

Related U.S. Application Data

(60) Provisional application No. 62/622,714, filed on Jan. 26, 2018.

(51) Int. Cl.
  *H04B 7/024* (2017.01)
  *H04L 41/069* (2022.01)
  *H04W 4/90* (2018.01)
  *H04W 80/08* (2009.01)
  *H04W 88/08* (2009.01)
  *H04W 88/12* (2009.01)

(52) U.S. Cl.
  CPC ........... *H04L 41/069* (2013.01); *H04W 80/08* (2013.01); *H04W 88/085* (2013.01); *H04W 88/12* (2013.01); *G06F 2009/45595* (2013.01); *H04W 4/90* (2018.02)

(56) References Cited

U.S. PATENT DOCUMENTS

| | | | |
|---|---|---|---|
| 2012/0057572 A1 | 3/2012 | Evans et al. | |
| 2013/0163539 A1 | 6/2013 | Cao et al. | |
| 2014/0269632 A1 | 9/2014 | Blankenship et al. | |
| 2014/0269859 A1 | 9/2014 | Hanson et al. | |
| 2015/0229372 A1* | 8/2015 | Perlman | H04B 7/024 375/267 |
| 2015/0271694 A1 | 9/2015 | Jung et al. | |
| 2015/0282069 A1 | 10/2015 | Hobbs et al. | |
| 2015/0311961 A1* | 10/2015 | Li | H04L 67/10 370/230 |
| 2016/0037550 A1 | 2/2016 | Barabell et al. | |
| 2016/0234832 A1* | 8/2016 | Hebert | H04B 1/0475 |
| 2016/0278110 A1* | 9/2016 | Lee | H04W 52/0219 |
| 2016/0295564 A1 | 10/2016 | Landry et al. | |
| 2017/0078143 A1 | 3/2017 | Zhao | |
| 2017/0257151 A1 | 9/2017 | Lange | |
| 2018/0157231 A1 | 6/2018 | Bogdan et al. | |
| 2018/0302799 A1 | 10/2018 | Hopcraft | |
| 2018/0351641 A1 | 12/2018 | Hoffmann et al. | |
| 2019/0132822 A1* | 5/2019 | Kim | H04B 7/0452 |
| 2019/0166549 A1 | 5/2019 | Ahmavaara et al. | |
| 2019/0174481 A1* | 6/2019 | Wei | H04W 72/20 |
| 2019/0238199 A1 | 8/2019 | Lupper et al. | |
| 2019/0261225 A1 | 8/2019 | Eswarakava et al. | |
| 2019/0364456 A1 | 11/2019 | Yu | |
| 2020/0068420 A1 | 2/2020 | Chen et al. | |
| 2020/0100119 A1 | 3/2020 | Byun et al. | |
| 2020/0275498 A1 | 8/2020 | Fiorani et al. | |
| 2021/0345119 A1* | 11/2021 | Futaki | H04W 16/02 |

OTHER PUBLICATIONS

Martinez-Lopez et al., "Self-Organized Heterogeneous Advanced Radio Networks Generation", Celtic-Plus, Project No. C2012/1-8, Jul. 11, 2014, pp. 1 through 130, Sharing.

Nakao et al., "Draft Technical Report: Report on application of network softwarization to IMT-2020", Telecommunication Standardization Sector Study Period 2013-2016, Focus Group on IMT-2020, IMT-O-041, Dec. 2016, pp. 1 through 147, International Tellecommunication Union.

European Patent Office, "Communication pursuant to Article 94(3)", from EP Application No. 19744213.0, from Foreign Counterpart to U.S. Appl. No. 16/256,765, Feb. 23, 2023, pp. 1 through 4, Published: EP.

Beyene et al., "Cloud-RAN Architecture for Indoor DAS", Special Section on Recent Advances in Cloud Radio Access Networks, Oct. 1, 2014, pp. 1205 through 1212, vol. 2, IEEE Access.

International Searching Authority, "International Search Report and Written Opinion from PCT Application No. PCT/US2019/014971 mailed Aug. 2, 2019", from Foreign Counterpart to U.S. Appl. No. 16/256,765, pp. 1-17. Published: WO.

U.S. Patent and Trademark Office, "Notice of Allowance", U.S. Appl. No. 16/256,765, Dec. 23, 2020, pp. 1 through 18, Published: US.

U.S. Patent and Trademark Office, "Office Action", U.S. Appl. No. 16/256,765, Jul. 22, 2020, pp. 1 through 30, Published: US.

U.S. Patent and Trademark Office, "Office Action", U.S. Appl. No. 16/256,765, Sep. 24, 2020, pp. 1 through 22, Published: US.

U.S. Patent and Trademark Office, "Restriction Requirement", U.S. Appl. No. 16/256,765, May 8, 2020, pp. 1 through 6, Published: US.

\* cited by examiner

CLOUD NETWORK IMPLEMENTATION FOR A DISTRIBUTED ANTENNA SYSTEM CONTROL PLANE

CROSS-REFERENT TO RELATED APPLICATIONS

This U.S. Patent Application is a Divisional Patent Application that claims priority to, and the benefit of U.S. patent application Ser. No. 16/256,765 titled "CLOUD NETWORK IMPLEMENTATION FOR A DISTRIBUTED ANTENNA SYSTEM CONTROL PLANE" filed on Jan. 24, 2019, which claims priority to, and the benefit of, U.S. Provisional Patent Application No. 62/622,714, titled "CLOUD NETWORK IMPLEMENTATION FOR A DISTRIBUTED ANTENNA SYSTEM CONTROL PLANE" filed on Jan. 26, 2018, each of which are incorporated herein by reference in their entirety.

BACKGROUND

A Distributed Antenna System (DAS) typically includes at least one master unit that is communicatively coupled with a plurality of remote antenna units. Each remote antenna unit can be coupled directly to the master unit or indirectly via one or more other remote antenna units and/or via one or more intermediary or expansion units. A DAS is typically used to improve the coverage provided by one or more base stations that are coupled to the master unit. These base stations can be coupled to the master unit via one or more cables or via a wireless connection, for example, using one or more donor antennas. In some implementations, a DAS may comprise more than one such master unit, for example to address redundancy concerns. The wireless service provided by the base stations can included commercial cellular service and/or public safety wireless communications.

A DAS is typically controlled by various software applications executed by a DAS controller which is implemented within a master unit of the DAS. For example, the master unit may comprise rack mounted controller hardware that includes a processor that executes the various functions of the DAS controller. In some systems, the DAS controller may be implemented by electronic components and processors located directly on the backplane of the DAS master unit. Functions performed by the DAS controller typically includes applications for managing aspects of controlling the DAS such as, but not limited to, hardware population, cabling, managing software updates, managing and maintaining a database of DAS hardware configuration, uplink and downlink RF component configurations, and overall system configuration, leveling of uplink and downlink RF signals, hardware diagnostics, generating and distributing alarms, and maintaining a log of alarms in a database on the DAS controller. The DAS controller typically also includes an SNMP interface providing operations and maintenance (O&M) access to the system operators, and may include a server providing a Web page interface for administration of the DAS. In short, the DAS controller implements the logic for controlling the signal processing and forwarding behavior of RF traffic through the DAS between the one or more base stations and user devices which are in wireless communication with the plurality of remote antenna units. This logic may be referred to as the DAS "control plane." In contrast, the DAS "user plane" provides the transport platform that forwards the RF traffic through the DAS according to the directions provided to the DAS user plane by the DAS control plane.

In that art today, both the control plane and user plane comprise hardware specific software that utilizes low level software that directly interfaces with the DAS hardware electronics, such a memories, registers, interrupts, and the like. This hardware specific software would be supplied by the DAS developer and provided to the operator at the time the DAS hardware is installed. As a result, a telecommunications system operator that owns and operates multiple DAS installations, not only needs to access each DAS installation separately to make updates, reconfigurations, or respond to alarm messages, but they also need maintain familiarity with the software and user interfaces associated with each installation. Moreover, scalability of the control plane at each DAS installation is limited by processing resources present and available for the DAS controller on the DAS hardware, thus potentially limiting the ability of a DAS operator to implement new protocols and standards and/or address increasing RF traffic demands.

For the reasons stated above and for other reasons stated below which will become apparent to those skilled in the art upon reading and understanding the specification, there is a need in the art for cloud network implementation for a distributed antenna system control plane.

SUMMARY

The Embodiments of the present disclosure provide for cloud network implementation for a distributed antenna system control plane and will be understood by reading and studying the following specification.

In one embodiment, a DAS architecture comprises: a DAS cloud computing network; a first distributed antenna system comprising at least a first user plane, wherein the first user plane includes uplink circuitry and downlink circuitry, wherein the uplink circuitry forwards uplink radio frequency traffic from at least one remote antenna unit of the first distributed antenna system to at least one master unit of the first distributed antenna system, wherein the downlink circuitry forwards downlink radio frequency traffic from the least one master unit to the at least one remote antenna unit; wherein the DAS cloud computing network comprises a control plane in communication with the first user plane of the first distributed antenna system through a network; wherein the first user plane comprises a high level protocol interface abstraction layer coupled to the network and processes and forwards the uplink and downlink radio frequency traffic based on configuration commands received from the control plane via the high level protocol interface abstraction layer.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure address limitations of DAS controllers in the art today through the separation of DAS control and user planes by the introduction of high level hardware access protocol interface and by off-boarding the DAS control plane functionality from the local DAS hardware and implementing the DAS controller either as virtual machine (VM) executed in a cloud network or as DAS applications offered as a cloud service by the cloud network. In some embodiments, an interface between the control plane and user plane is achieved using high level command and response protocols that are non-hardware specific. That is, the interface between the control and the user plane provides high level description of data and commands to control the user plane and exchange information. The user plane processes and forwards uplink and downlink radio frequency traffic based on configuration messages received from a control plane. The interface between further provides an abstraction from the underlying hardware so that the DAS controller does not require any detailed knowledge of the hardware to be configured and controlled, thus avoiding the need for the DAS controller to utilize low level hardware command sequences to communicate instructions to the user plane. Moreover, with such an abstraction, digital as well as analog user plane hardware can be used transparently via the high level protocol interface.

Figure 1:
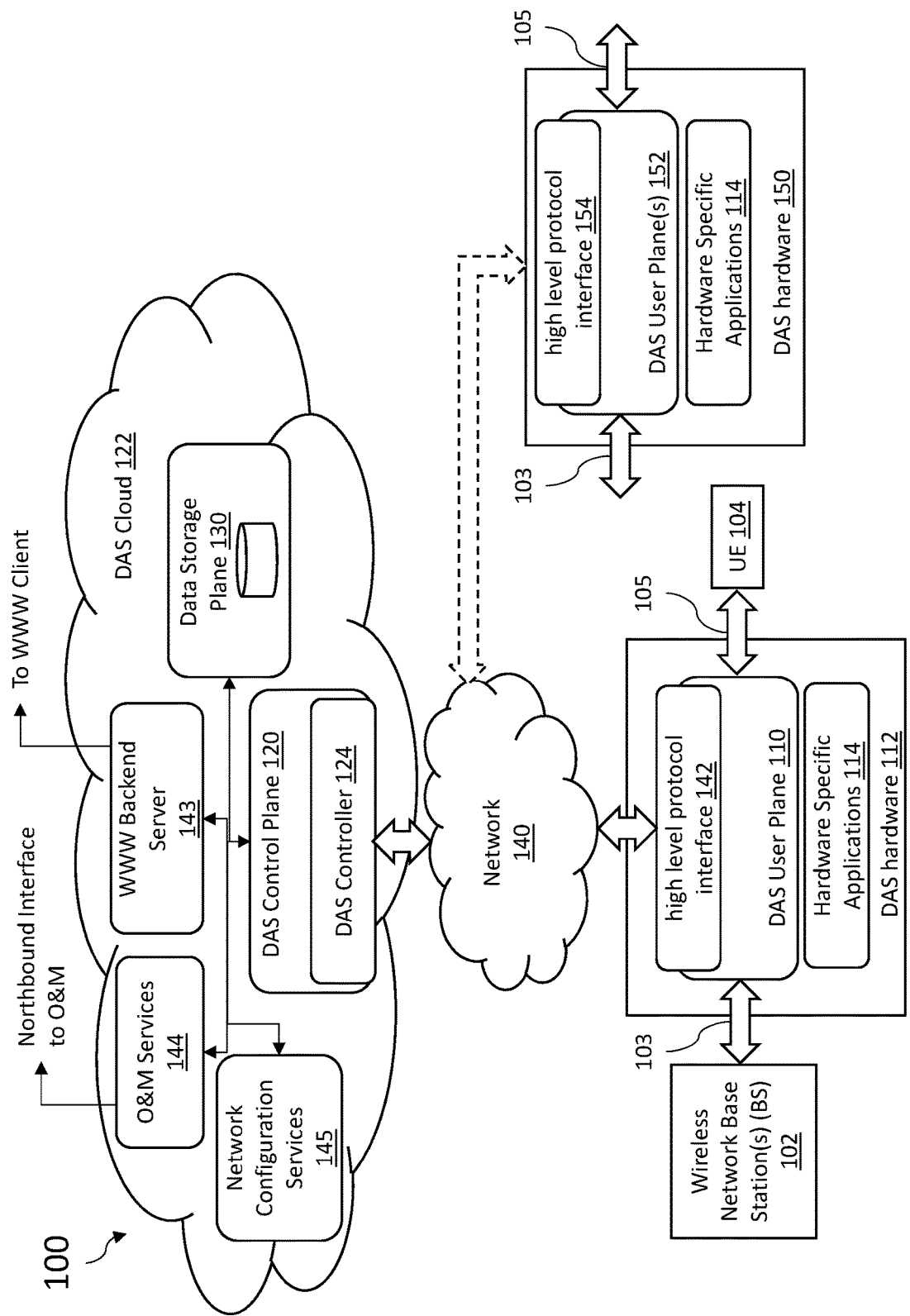
FIG. 1 is a diagram illustrating an example DAS architecture for one embodiment of the present disclosure having a control and user planes are separated.

FIG. 1 is a diagram illustrating a DAS architecture 100 for one embodiment of the present disclosure where the DAS controller and user planes are separated. As illustrated in FIG. 1, a user plane 110 is implemented in DAS hardware 112 by executing hardware specific user plane applications 114 that process and transport RF communication traffic between one or more wireless network base stations 102 (shown as communication traffic 103) and user equipment 104 (shown as communication traffic 105). As further discussed below, the user plane applications 114 may be executed by controllers in DAS master units, remote antenna units, extension and/or expansion units, or some combination thereof. Rather than also being implemented in DAS hardware 112, the control plane 120 is implemented virtually in by a DAS cloud computing network 122 (referred to herein as a "DAS cloud" 122) in order to realize the DAS controller 124. That is, one or more network nodes of the DAS cloud 122 may comprise processors that execute the functions described herein of the control plane 122 and DAS controller 124. Moreover, the storage for persistent system level data (previously maintained on DAS hardware 112) may also be separated into the DAS cloud 122 and maintained on a data plane 130 (for example, a shared database) on DAS cloud 122 that is accessible from the DAS controller 124 via a defined data access protocol. In some embodiments, the data plane 130 is also separate from the DAS controller 124 within DAS cloud 112, to allow for moving database tables to dedicated machines (either real or virtual machines) and thus further improve performance and scalability. Additionally, databases can be shared between DAS cloud 112 components such as, but not limited to, Network Configuration Services, O&M services, the DAS Controller and the WWW Backend Server which avoids redundancies in data and further speeds up the data access.

As shown in FIG. 1, the user plane 110 implemented in DAS hardware 112, and the DAS controller 124 implemented in DAS cloud 122 are communicatively coupled via a network 140 (which may comprise an Internet Protocol (IP) network such as the Internet, for example). In one embodiment, the user plane 110 includes a high level command and response protocol interface 142 (referred to herein as "high level protocol interface") through which the DAS controller 124 communicates to the user plane 110. High level protocol interface 142 provides an abstraction layer through which the DAS controller 124 can send non-hardware specific commands and data in order to configure operation of the user plane 110. The high level protocol interface 142, in contrast, can communicate with the components of DAS hardware 112, either directly or indirectly, to configure the DAS hardware 112 to operate as directed by the DAS controller 124. For example, the DAS controller 124 may send a command to the user plane 110 via high level protocol interface 142 to vary the transmit power of a first cellular band, designated RF band #1 for example. In doing so, the DAS controller 124 may simply pass to the high level protocol interface 142 the designated band "RF band #1" and the desired transmit power, without the need for any underlying knowledge about which hardware registers, amplifiers, processors, etc. of DAS hardware 112 handle the processing of RF band #1. Instead, the high level protocol interface 142 interprets such instructions into DAS hardware 112 specific instructions in order to carry out the high-level commands received form the DAS controller 124. In the same way, hardware level alarms or messages generated by the DAS hardware 112 may be received by the high level protocol interface 142 and translated to a high-level alarm notification to the DAS controller 124 over network 140.

In some embodiments, the DAS cloud 122 may further comprise servers or network nodes. In one embodiment, the network nodes may comprise processors that implement network configuration services 145, an internet World Wide Web (WWW) backend server 143, a northbound interface (NBI) to operations and maintenance service 144, or both, with which the DAS operator may interact with, and control, any aspect of the control plane 120 and/or data plane 130. Such a configuration supports the provision of user interfaces according to the Model View Controller (MVC) software architecture pattern which allows for clear separation between of the Web Front End (Client) and Web Backend.

It should be understood that architecture 100 may be expanded in other embodiments to include multiple user plane entities which are managed by a control plane 120 from the DAS cloud 122. That is, one or more additional instances of user plane entities, which may be operated either in conjunction with DAS hardware 112 or completely independent from DAS hardware 112, may be managed and operated using architecture 100. For example, in FIG. 1, one or more additional user planes 152 may be communicatively coupled to the DAS cloud 122 via network 140 and operated in the same manner as described above regarding user plane 110. In the embodiment shown in FIG. 1, the additional user planes 152 may be executed by DAS hardware 150 which is separate and independent from DAS hardware 112. However, in other embodiments, one or more of the additional user planes 152 may also be executed by DAS hardware 112. Each of the additional user planes 152 comprises a high level command and response protocol interface 154 and may be communicatively coupled to the DAS cloud 122 via network 140 and operated in the same manner as described above regarding DAS hardware 112 and user plane 110. In this way, multiple DAS installations may be managed by an operator via the DAS cloud 122 without the need to connect to and utilize hardware specific software for each installation. Moreover, in some embodiments, the storage for persistent system level data for DAS hardware 112 and DAS hardware 150 (and/or any other DAS installations) is maintained together on data plane 130, thus providing a database that comprises a shared set of tables for all pertinent information relevant to the operator's communication system.

The separation of the control and user planes of a DAS as illustrated by DAS architecture 100 supports scalability with respect to increasing RF communications traffic between BTS and user devices by enabling the DAS operator to add user plane nodes without changing the number of controllers in the network. Other benefits include a clear control and O&M interface between control plane and user plane, the flexibility to locate and scale the control plane and control plane resources independent of the processing resources available at the DAS, and independent evolution and development of the control plane and user plane functions. In some embodiments, the control plane implemented in the DAS cloud can be technology agnostic and control analog as well as digital user planes, and used in conjunction with multiple user plane entities. Moreover, certain functions of a DAS control plane are rarely used, or may even just be used once at the time of DAS commissioning. With such functions implemented by software executed in the DAS cloud, a single installation of the software can be shared by multiple user plane entities.

As mentioned above, in alternative embodiments, a DAS controller 124 may be realized either by establishing one or more DAS controller virtual machines in DAS cloud 122, or by directly providing DAS applications associated with DAS controller functions as services available from DAS cloud 122. It should be understood that the virtualized DAS Controllers and Cloud Services, and network nodes, servers, gateways, and/or other components comprising the DAS cloud 122 may be executed from a data center of a DAS operator and/or any other cloud service provider. In fact, the physical location of the control plane/DAS Controller is no longer relevant as only the user plane 110 and RF components comprising the DAS hardware 112 need to be located at the DAS site. DAS cloud 122 resources can be allocated on demand and expenses incurred from running the DAS Controller, System Configuration, and Network Element Management Functions, for example, can be tailored to the needs of the system operator.

Figure 2:
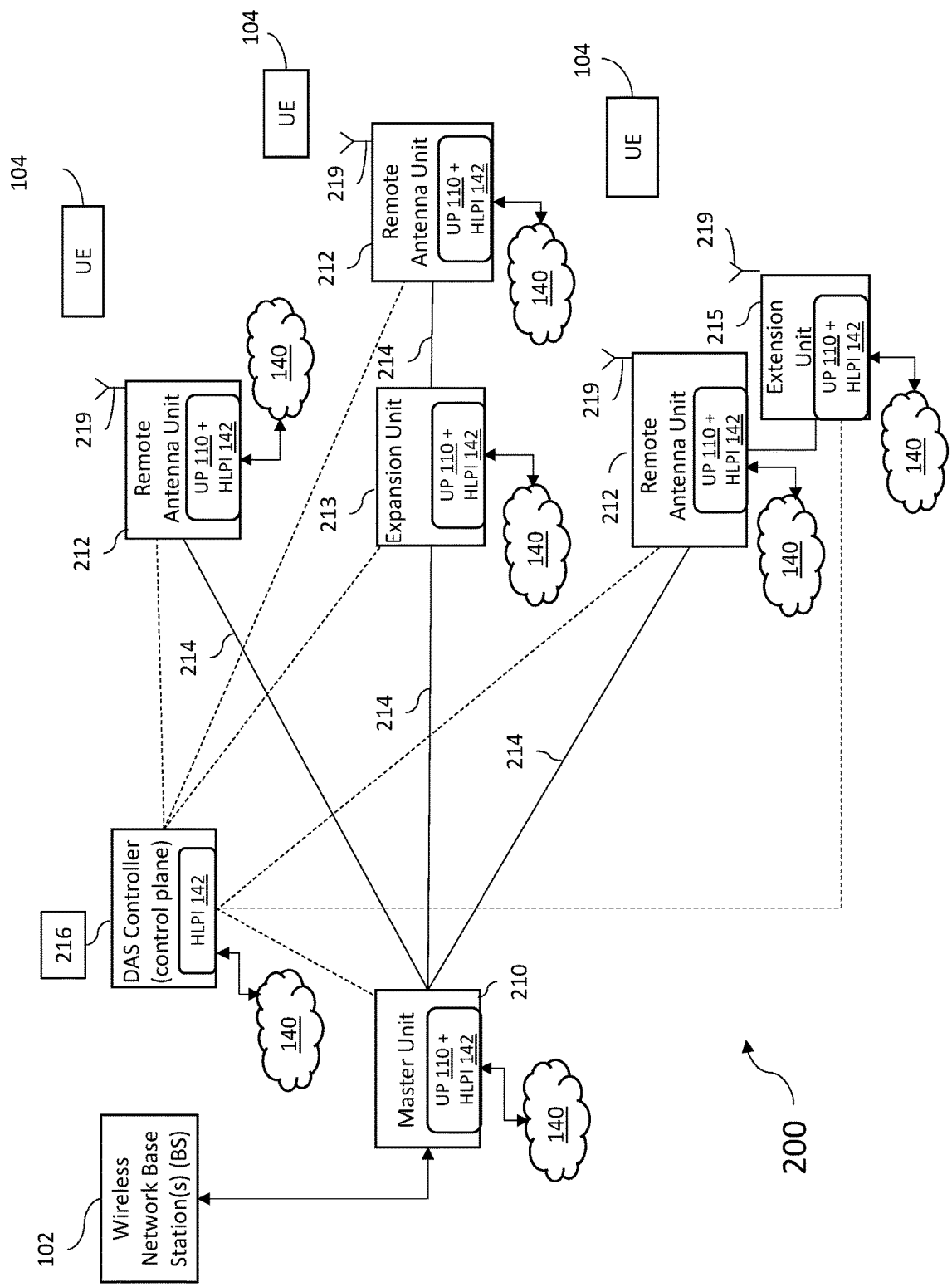
FIGS. 2, 2A, 2B, 2C, 2D and 2E are block diagrams illustrating components of an example DAS installation of one embodiment of the present disclosure.

FIG. 2 is a block diagram illustrating an example DAS 200 (also referred to herein as a DAS installation) of one embodiment of the present disclosure. DAS 200 comprises one or more master units 210 that are communicatively coupled to one or more remote antenna units 212 via one or more communication links 214. In various different embodiments, the communication links 214 may comprise wireless communication links, cables (i.e. wired communication links), or some combination thereof. As used herein, the term cable is used generically and may refer to either electrical or fiber optic cables, or hybrid cables comprising both electrical conductors and optical fibers. It should be understood that DAS 200 may provide wireless telecommunication services to a building, plant, campus, transportation hub, tunnel, or any other type of facility. In some embodiments, the communication links 214 discussed herein may each operate bidirectionally with downlink and uplink communications carried over the link. It should also be understood, however, that in other embodiments, a communication link 214 may itself further comprise a pair of links including, for example, an uplink cable for uplink communication, and a downlink cable for downlink communication. Each remote antenna unit 212 can be communicatively coupled directly to one or more of the master units 210 or indirectly via one or more other remote antenna units 212 and/or via one or more intermediary or expansion units 213. In some embodiments, DAS 200 may further include one or more extension units 215 that are communicatively coupled to a remote antenna unit 212 to further extend coverage. As illustrated in FIG. 2, with embodiments of the present disclosure the control plane 120 is separated from user plane 110 by implementing the control plane 120 as a DAS controller on a separate machine (as shown at 216) and/or in a virtualized environment or in the cloud as discussed in greater detail below. Regardless of where or how the functions of a DAS controller 216 are specifically implemented, control plane 120 functions for the DAS 200 are executed on a platform separate from the DAS 200 hardware and their associated services provided to each of the Master Unit 210, Remote Antenna Units 212, and Expansion Units 213 and Extension Units 215 (when present) via the high level protocol interface 142.

Each master unit 210 is communicatively coupled to one or more base stations 102 (such as the wireless network base stations 102 described in FIG. 1). In some embodiments, one or more of the base stations 102 can be co-located with the respective master units 210 to which it is coupled (for example, where the base station 102 is dedicated to providing base station capacity to the DAS 200 and is coupled to the respective master units 210). Also, one or more of the base stations 102 can be located remotely from the respective master units 210 to which it is coupled (for example, where the base station 102 provides base station capacity to an area beyond the coverage area of the DAS 200). In this latter case, the master unit 210 can be coupled to a donor antenna and repeater or bi-directional amplifier in order to wirelessly communicate with the remotely located base station 102.

In this exemplary embodiment, the base stations 102 include one or more base stations that are used to provide public and/or private safety wireless services (for example, wireless communications used by emergency services organizations (such as police, fire and emergency medical services) to prevent or respond to incidents that harm or endanger persons or property. Such base stations are also referred to here as "safety wireless service base stations" or "safety base stations." The base stations 102 also can include, in addition to safety base stations, one or more base stations that are used to provide commercial cellular wireless service. Such base stations are also referred to here as "commercial wireless service base stations" or "commercial base stations."

The base stations 102 can be coupled to the master units 210 using a network of attenuators, combiners, splitters, amplifiers, filters, cross-connects, etc., (sometimes referred to collectively as a "point-of-interface" or "POI"). This network can be included in the master units 210 and/or can be separate from the master units 210. This is done so that, in the downlink, the desired set of RF channels output by the base stations 102 can be extracted, combined, and routed to the appropriate master units 210, and so that, in the upstream, the desired set of carriers output by the master units 210 can be extracted, combined, and routed to the appropriate interface of each base station 102. It is to be understood, however, that this is one example and that other embodiments can be implemented in other ways.

Figure 2A:
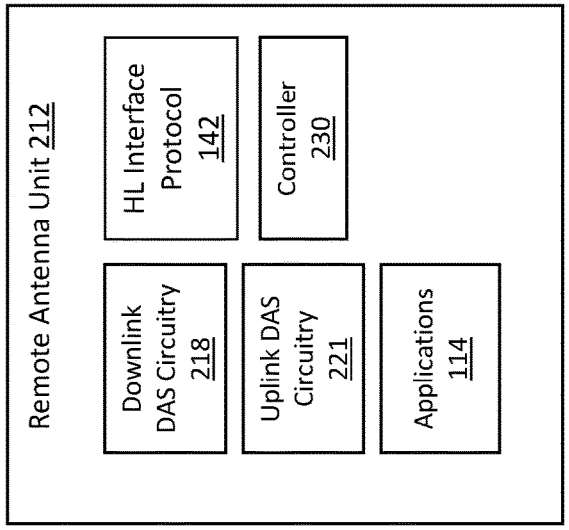

As shown in FIG. 2A, in general, each master unit 210 comprises downlink DAS circuitry 211, uplink DAS circuitry 224 and a controller 230 (that together comprise a segment of the DAS hardware 112) and hardware specific applications 114 that execute on the controller 230 (for example to implement the high level protocol interface 142). These elements together define the user plane 110 within the master unit 210 that processes and transports RF communications traffic 103 and 105 between the one or more wireless network base stations 102 and user equipment 104. Control plane services for the DAS 200 are separated from the master unit 210 and implemented elsewhere, such as by DAS controller 216 described below. High level protocol interface 142 provides the necessary connectivity between master unit 210 and systems implementing the control plane services.

Downlink DAS circuitry 211 is configured to receive one or more downlink signals from one or more base stations 102. These signals are also referred to here as "base station downlink signals." Each base station downlink signal includes one or more radio frequency channels used for communicating in the downlink direction with user equipment 104 (such as tablets or cellular telephone, for example) over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol). The downlink DAS circuitry 211 in each master unit 210 is also configured to generate one or more downlink transport signals derived from one or more base station downlink signals and to transmit one or more downlink transport signals to one or more of the remote antenna units 212. Each master unit 210 also comprises the uplink DAS circuitry 224 that is configured to receive the respective uplink transport signals transmitted to it from one or more remote antenna units 212 and to use the received uplink transport signals to generate one or more base station uplink radio frequency signals that are provided to the one or more base stations 102. Typically, this involves, among other things, combining or summing uplink signals received from multiple remote antenna units 212 in order to produce the base station uplink signal provided to each base station 102. Each base station uplink signal includes one or more of the uplink radio frequency channels used for communicating with user equipment 104 over the wireless air interface. In this way, the DAS 200 increases the coverage area for the uplink capacity provided by the base stations 102.

Figure 2B:
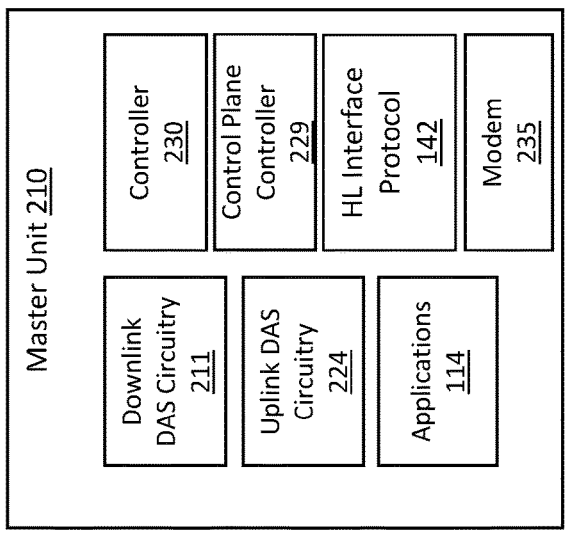

As shown in FIG. 2B, each remote antenna unit 212, in general, comprises downlink DAS circuitry 218, uplink DAS circuitry 221 and a controller 230 (that together comprise a segment of the DAS hardware 112) and hardware specific applications 114 that execute on the controller 230 (for example to implement the high level protocol interface 142). Downlink DAS circuitry 218 is configured to receive the downlink transport signals transmitted to it from one or more master units 210 and to use the received downlink transport signals to generate one or more downlink radio frequency signals that are radiated from one or more antennas 219 associated with that remote antenna unit 212 for reception by user equipment 104. These downlink radio frequency signals are analog radio frequency signals and are also referred to here as "remote downlink radio frequency signals." Each remote downlink radio frequency signal includes one or more of the downlink radio frequency channels used for communicating with user equipment 104 over the wireless air interface.

Also, each remote antenna unit 212 comprises uplink DAS circuitry 221 that is configured to receive via antenna(s) 219 one or more uplink radio frequency signals transmitted from the user equipment 104. These signals are analog radio frequency signals and are also referred to here as "remote uplink radio frequency signals." Each uplink radio frequency signal includes one or more radio frequency channels used for communicating in the uplink direction with user equipment 104 over the relevant wireless air interface. The uplink DAS circuitry 221 in each remote antenna unit 212 is also configured to generate one or more uplink transport signals derived from the one or more remote uplink radio frequency signals and to transmit one or more uplink transport signals to one or more of the master units 210.

Figure 2C:
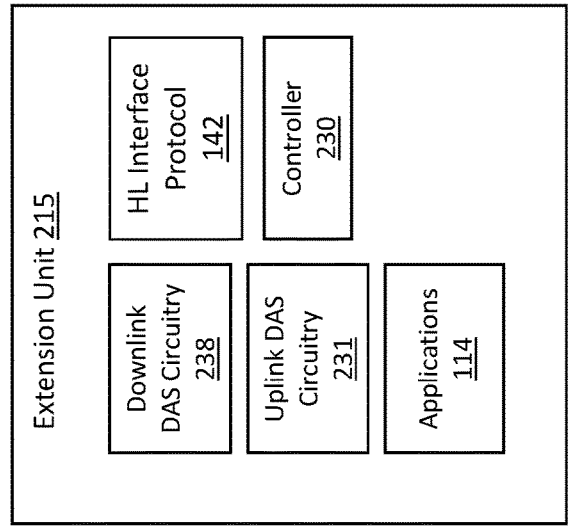

As shown in FIG. 2C, each expansion unit 213, in general, comprises downlink DAS circuitry 226, uplink DAS circuitry 228 and a controller 230 (that together comprise a segment of the DAS hardware 112) and hardware specific applications 114 that execute on the controller 230 (for example to implement the high level protocol interface 142). Downlink DAS circuitry 226 that is configured to receive the downlink transport signals transmitted to it from the master unit 210 (or other expansion unit 213) and transmits the downlink transport signals to one or more remote antenna units 212 or other downstream intermediary units 213. Each expansion unit 213 comprises uplink DAS circuitry 228 that is configured to receive the respective uplink transport signals transmitted to it from one or more remote antenna units 212 or other downstream intermediary units 213, combine or sum the received uplink transport signals, and transmit the combined uplink transport signals upstream to the master unit 210 or other expansion unit 213. In some embodiments, one or more remote antenna units 212 may be coupled to the one or more master units 210 via one or more other remote antenna units 212 (for examples, where the remote antenna units 212 are coupled together in a daisy chain or ring topology). In such embodiments, an expansion unit 213 may be implemented using a remote antenna units 212.

Figure 2D:
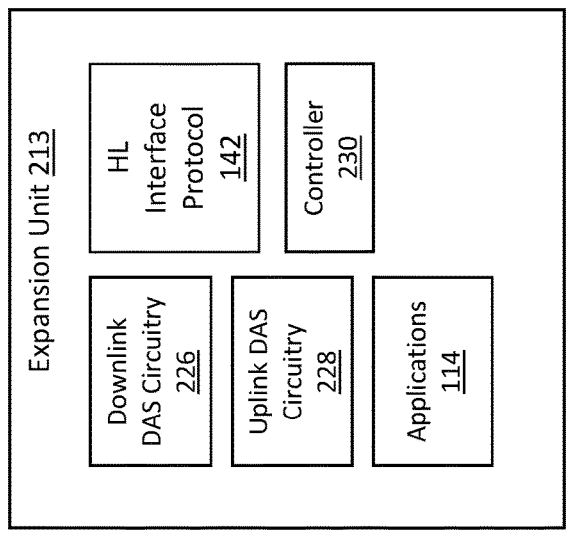

As shown in FIG. 2D, each extension unit 215, in general, comprises downlink DAS circuitry 238, uplink DAS circuitry 231 and a controller 230 (that together comprise a segment of the DAS hardware 112) and hardware specific applications 114 that execute on the controller 230 (for example to implement the high level protocol interface 142).

Downlink DAS circuitry 238 is configured to receive the downlink transport signals transmitted to it from a remote antenna unit 212 and to use the received downlink transport signals to generate one or more downlink radio frequency signals that are radiated from one or more antennas 219 associated with that extension unit 215 for reception by user equipment 104. Each downlink radio frequency signal includes one or more of the downlink radio frequency channels used for communicating with user equipment 104 over the wireless air interface. In this way, the DAS 200 may even further increase the coverage area and/or capacity for the downlink capacity provided by the base stations 102. Each extension unit 215 may further comprise uplink DAS circuitry 231 that is configured to receive via antenna(s) 219 one or more uplink radio frequency signals transmitted from the user equipment 104. These signals are analog radio frequency signals and are also referred to here as "uplink radio frequency signals." Each uplink radio frequency signal includes one or more radio frequency channels used for communicating in the uplink direction with user equipment 104 over the relevant wireless air interface. The uplink DAS circuitry 231 in each extension unit 215 may also be configured to generate one or more uplink transport signals derived from the one or more remote uplink radio frequency signals and to transmit one or more uplink transport signals to the remote antenna unit 212 to which it is coupled. In some embodiments, the uplink DAS circuitry 221 in a remote antenna unit 212 may be further configured to receive the respective uplink transport signals transmitted to it from an extension unit 215 and to use the received uplink transport signals to generate uplink radio frequency signals that are provided to the master unit 210.

Figure 2E:
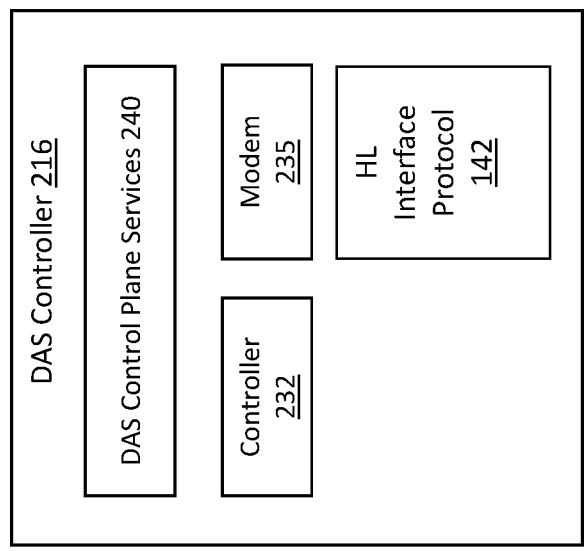

As shown in FIG. 2E, in one embodiment, a DAS Controller 216, in general may comprise a controller 232 that executes the DAS Control Plane Services 240 to realize the control plane function for DAS 200 either on a separate machine, in a virtualized environment or in the cloud. Moreover, the high level protocol interface 142 in the DAS Controller 216 provides the necessary connectivity between DAS Controller 216 and the DAS 200 user plane functions that are executed on the various DAS 200 hardware components. In one embodiment, the DAS Controller 216 may comprise a modem 235 in order to communicatively couple DAS Controller 216 to network 140.

The downlink DAS circuitry 211, 218, 226, and 238 and uplink DAS circuitry 224, 221, 228 and 231 in each master unit 210, remote antenna unit 212, expansion unit 213, and extension unit 215, respectively, can comprise one or more appropriate connectors, attenuators, combiners, splitters, amplifiers, filters, duplexers, analog-to-digital converters, digital-to-analog converters, mixers, field-programmable gate arrays (FPGAs), microprocessors, transceivers, framers, etc., to implement the features described above. Also, the downlink DAS circuitry 211, 218, 226, and 238 and uplink DAS circuitry 224, 221, 228 and 231 may share common circuitry and/or components. For example, some components (such as duplexers) by their nature are shared among the downlink DAS circuitry 211, 218, 226, and 238 and uplink DAS circuitry 224, 221, 228 and 231.

The DAS 200 can use either digital transport, analog transport, or combinations of digital and analog transport for generating and communicating the transport signals between the base station 102, the master units 210, the remote antenna units 212, and any expansion units 213. For the purposes of illustration, some of the embodiments described here are implemented using analog transport over optical cables. However, it is to be understood that other embodiments can be implemented in other ways, for example, in DASs that use other types of analog transport (for example, using other types of cable and/or using analog transport that makes use of frequency shifting), digital transport (for example, where digital samples indicative of the analog base station radio frequency signals and analog remote radio frequency signals are generated and communicated between the master units 210 and the remote antenna units 212), or combinations of analog and digital transport.

Each unit 210, 212, 213, 215 in the DAS 200 can also comprise a respective controller 230, which as discussed above, executes the hardware specific user plane applications 114 and high level protocol interface 142 for the user plane 110 implemented within that particular unit. The controller 230 is implemented using one or more programmable processors and memory hardware that execute software that is configured to implement the various features described here as being implemented by the controller 230. The controller 230, the various features described here as being implemented by the controller 230, or portions thereof, can be implemented in other ways (for example, in a field programmable gate array (FPGA), application specific integrated circuit (ASIC), etc.). The master unit 210 may comprise a modem 235 communicatively coupled to network 140. In one embodiment, each unit 210, 212, 213, 215 in the DAS 200 is also configured to send and receive management and control data with control plane 120 via a high level protocol implemented by the high level protocol interface 142.

Figure 3:
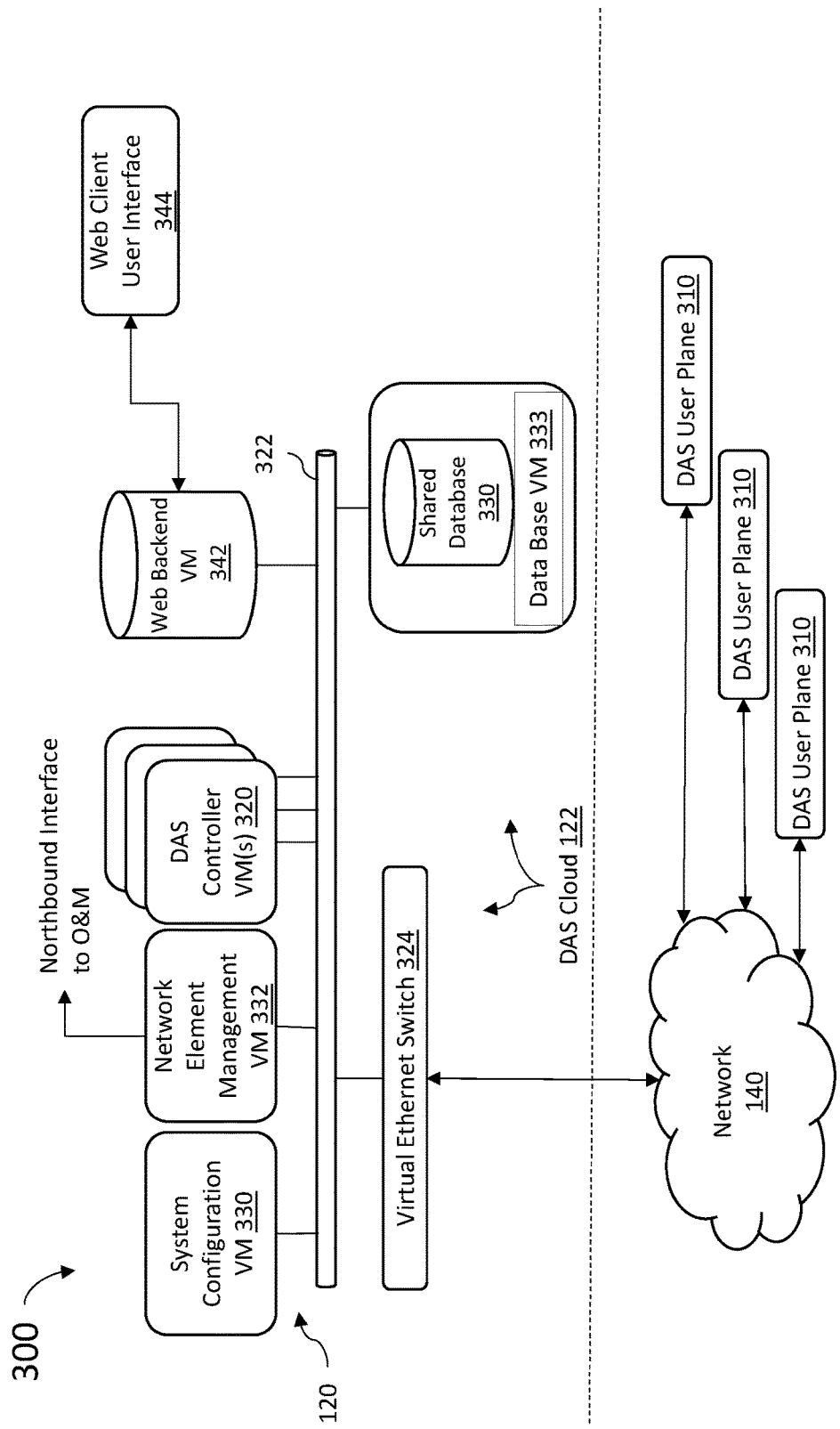
FIG. 3 is a diagram illustrating another example DAS architecture for one embodiment of the present disclosure having control and user planes separated.

FIG. 3 illustrates an example embodiment of a DAS architecture 300 providing an example implementation of the DAS architecture 100 discussed with respect to FIG. 1. In the embodiment DAS architecture 300 one or more DAS Controllers are implemented as DAS Controller Virtual Machine(s) 320 within DAS cloud 120. In this embodiment, the web backend is realized using a Web Backend Virtual Machine (VM) 342 (i.e., a web server) and the data plane 130 is realized using a Data Base Virtual Machine (VM) 333 which comprises the shared database 330. Communication between the DAS Controller Virtual Machine(s) 320, the Web Backend Virtual Machine 342, and the Shared Database 330 may be implemented by a Message and Data Bus 322, through which every functional entity of DAS cloud 122 can access data and send commands to any other entity coupled to bus 322. In various embodiments, the Message and Data Bus 322 may be implemented, for example, using ethernet or any other type of communications technology.

As shown in FIG. 3, DAS architecture 300 may include multiple user plane entities (shown at 310) communicatively coupled to DAS cloud 120 via a communications network 140. Each of the user plane entities 310 may comprise a user plane 110 such as shown in FIG. 1 and correspond to the user plane of a DAS as shown in FIG. 2. In some embodiments, communications between the DAS Controller Virtual Machines 320 and the user planes 310 may be based on IP protocols and/or secured by VPN tunnels and/or firewalls. In some embodiments, DAS cloud 120 further comprises a virtual Ethernet switch 324 that switches Ethernet packets between the user plane entities 310 and the DAS Controller Virtual Machine 320 with which they are associated. There may exist a one-to-one correspondence between one of the DAS Controller Virtual Machines 320 and a respective one of the user planes 310. However, in other embodiments that need not be the case. For example, any one of the DAS Controller Virtual Machines 320 may work in conjunction with two or more of the user planes 310. Similarly, any one of the user planes 310 may be subdivided into a multiple logical user planes each associated with a separate one of the DAS Controller Virtual Machines 220. As shown in the embodiment of FIG. 3, the DAS architecture 300 may further comprise a System Configuration Virtual Machine 330, and a Network Element Management Virtual Machine 332, each implemented by DAS cloud 120 and coupled to Message and Data Bus 322.

Integration of the DAS Controller functionality and sharing of DAS system data in DAS cloud 120 with the System Configuration Virtual Machine 330 and Network Element Management Virtual Machine 332 may be achieved by sharing common data stored in the shared database 330 and/or by using the same web backend 342 and a web frontend 344 (i.e., a WWW client) for user access. In some embodiments, the web frontend client 244 may be executed by a human interface device integrated into a server or other node coupled to DAS cloud 120.

System Configuration Virtual Machine 330 executes one or more applications which may be used to configure operation of various aspects of the DAS cloud 120. For example, in one embodiment, the System Configuration Virtual Machine 330 executes applications that manage functions such as, but not limited to: RF Network Planning, RF Output Power Management, Optical Transport Capacity Management, Service Distribution Configuration, Hardware Configuration & bill-of-material (BOM), Inventory, and DAS Cloud user rights management. In some embodiments, the Network Element Management Virtual Machine 332 provides the interface to the proprietary operations and maintenance services 144 for the network operator to control their DAS installations (for example via a northbound interface (NBI) to operations and maintenance service). The Network Element Management Virtual Machine 332 may execute one or more applications to provide functions such as, but not limited to: Fault Management (which may include generating, distributing and logging active alarms, alarm history, remedy, acknowledgement, etc.), Configuration Management (which may include hardware and RF electronics connectivity and alarm parameter changes, for example), Inventory Management (which may include an inventory of DAS hardware and software components and change history), Performance Management (which may include Alarm Statistics, hardware and RF component data graphs, etc.), User Management (which may include role and rights administration of user accounts for the system operator), Security Management (which may include VPN management, NE Base Image updates, control of software/application inventory), and or application or script processing for automation of routine tasks (such as software distribution and activation, NE backup, managing bulk configuration changes, etc.).

As there are common functionalities performed by the System Configuration Virtual Machine 330 and a Network Element Management Virtual Machine 332, with embodiments of the present disclosure, storage of the database tables used by both system in the common data plane 130 with common access to shared database 330 ensures the data consistency between the applications, (either on the same virtual machine or on different virtual machines) and ensures that updates to data made by one virtual machine is immediately available to the other. In some embodiments, the same access to the shared database 330 may be selectively afforded to any component coupled to Message and Data Bus 322.

As mentioned above, access to the common data stored in the shared database 330 may also be obtained via a WWW webpage server implemented by web backend 342 and accessed by a web frontend client (or web client user interface) 344. Web client user interface 344 thus provides a common user interface and single access point for a user to manage the operation and configuration of any user plane entity 310. In one embodiment, the web backend 242 may serve web pages associated with each of various DAS applications provided by the virtual machines implemented in the DAS cloud 122 (for example, DAS Controller VMs 320, Network Element Management System VM 332, and/or System Configuration VM 330) to the web frontend client 344. In one embodiment, the web backend VM 342 may interface with each of the respective DAS applications via a defined Application Programing Interface (API) (for example, using a Representational state transfer API, or JavaScript Object Notation based messaging) to request information and trigger commands and forwards the results to the web frontend client 344. For certain operations the web backend VM 342 may also have direct access to the shared database 330 rather than depend on access via the virtual machines. In some embodiments, different roles in DAS Commissioning and Operation as well as access control may be handled via user management from the common user interface provided by the web frontend client 344.

The virtualization of the control plane 120 functions for execution by the DAS cloud 122 saves costs over the need to provide dedicated DAS controllers locally at each DAS installation, and provides the flexibility that one controller can essentially be used to replace multiple traditional DAS control planes. Scalability for a DAS controller 320 in DAS architecture 300 is also obtained through the ability to simply allocate additional processing resources from within the DAS Cloud 122 (for example, additional or more powerful processing units, memory, disk space, etc.) to the virtual machine 320 that executes that respective DAS controller.

As mentioned above, in alternative embodiments, a DAS controller 124 may be realized either by establishing one or more DAS controller virtual machines in DAS cloud 122, or by directly providing DAS applications associated with DAS controller functions as services available from DAS cloud 122.

Figure 4:
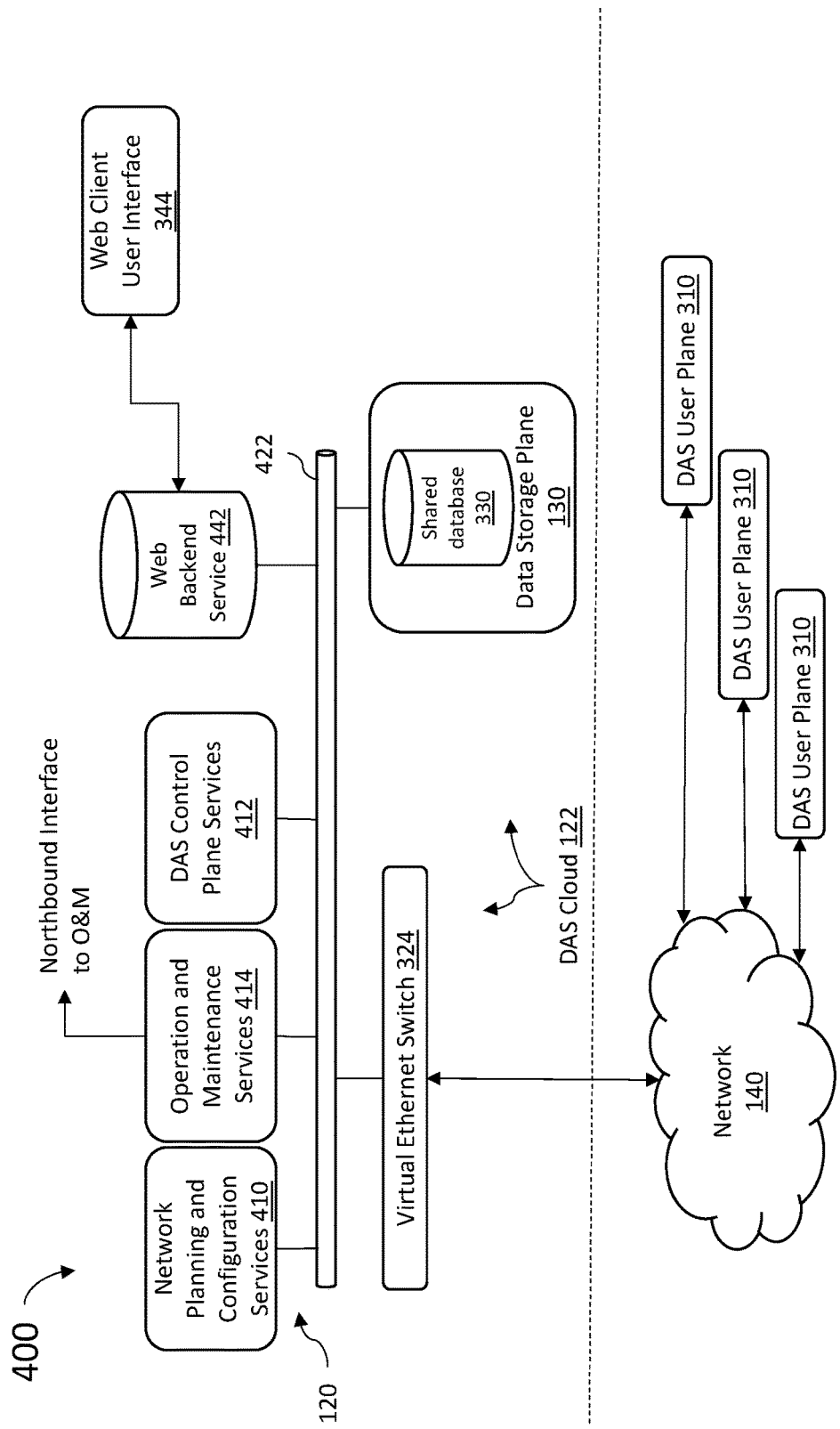
FIG. 4 is a diagram illustrating another example DAS architecture for one embodiment of the present disclosure having control and user planes separated.

FIG. 4 illustrates an alternative embodiment of a DAS architecture 400 for another example implementation of the DAS architecture 100. In DAS architecture 400, the DAS applications associated with the DAS controllers, System Configuration, and Network Element Management functions discussed above are directly provided as services available from applications executed by the DAS cloud 122. That is, the virtualized applications discussed in DAS architecture 400 are broken up into single functions that are grouped into separate cloud services 410, 412 and 414. Each of the cloud services are in turn implemented by the execution of particular applications by processors on nodes of DAS cloud 122. In the particular implementation shown in FIG. 4, the separate cloud services provided by DAS cloud 122 are grouped into Network Planning and Configuration Services 410 (which may include applications that execute functions such as RF Planning, BOM Creation, Optical Transport Configuration, for example), DAS Control Plane Services 412 (which may include applications that execute functions use at the time a DAS is commissioned, such as hardware population, cabling, leveling, service configuration, for example) and Operation and Maintenance Services 414 (which may include applications that execute functions such as RF Monitoring, Alarm functions, Performance Management, and so forth) which may include a northbound interface (NBI) to operations and maintenance service. It should be understood that in other embodiments, these functions may be grouped together differently and/or together with additional functions into any number of distinct cloud services.

In the DAS architecture 400, each of the provided cloud services 410, 412, 414 are in communication with the Message and Data Bus 422, along with Web Backend Services 442, and the data plane 130 which comprises the shared database 330. Through the Message and Data Bus 322 every functional entity of DAS cloud 120, including each of the applications used to provide the cloud services 410, 412 and 414, can access data and send commands to any other entity coupled to bus 322. DAS architecture 300 may also include multiple user plane entities 310 communicatively coupled to DAS cloud 120 via a communications network 140. Communications between the cloud services 410, 412, 414 and the user planes entities 310 may be based on IP protocols and/or secured by VPN tunnels and/or firewalls. In some embodiments, DAS cloud 120 in DAS architecture 400 may also further comprise virtual Ethernet switch 324 that switches Ethernet packets between the user plane entities 310 and the cloud services 410, 412, 414 that interact with the user plane entities 210.

In the particular DAS architecture 400 shown in FIG. 4, there is no longer any need for any correspondence between distinct DAS Controllers and respective user plane entities because the cloud services 410, 412, and 414 essentially function as a single centralized DAS Controller for all of the user plane entities 310. However, in some embodiments, since cloud services 410, 412, 414 may be configured to recognize logical user planes which may comprise the union of two or more of the user planes 310, a subdivision of any one or more of the user planes 310, or combinations thereof. In the same manner as discussed above, sharing of DAS system data in DAS cloud 120 across all cloud services may be achieved by sharing common data stored in the shared database 330 and/or by using the same web backend 342 and a web frontend (i.e., a WWW client) 344 for user access. Storage of the database tables used by the cloud services 410, 412, 414 in the common data plane 130 with common access to shared database 330 ensures the data consistency between applications and ensures that updates to data made by one cloud service 410, 412, 414 is immediately available to the others. The same access to the shared database 330 may be selectively afforded to any component coupled to Message and Data Bus 322.

An advantage of Cloud Services as provided by DAS architecture 400 is that DAS Functions traditionally provided by separate DAS controllers can be shared between DAS sites while functional and structural redundancies can be removed. Further the DAS Cloud Services can save resources and be scaled to the needs. For instance, the Planning and Configuration Services 410 as well as DAS Control Plane Services 412 are processes that typically are only used at the time of a DAS installation. Accordingly, such services may be suspended during normal steady state operation to conserve processing resources.

Example Embodiments

Example 1 includes a distributed antenna system (DAS), the system comprising: at least one master unit configured to receive a base station downlink radio frequency signal and to transmit a base station uplink radio frequency signal; at least one remote antenna unit that is communicatively coupled to the at least one master unit, the remote antenna unit comprising a power amplifier and configured to radiate a remote downlink radio frequency signal from at least one antenna associated with the remote antenna unit, the remote antenna unit further configured to receive a remote uplink radio frequency signal from at least one antenna associated with the remote antenna unit; at least a first user plane comprising uplink circuitry and downlink circuitry, wherein the uplink circuitry forwards uplink radio frequency traffic from the least one remote antenna unit to the at least one master unit, wherein the base station uplink radio frequency signal at least in part comprises the uplink radio frequency traffic, wherein the downlink circuitry forwards downlink radio frequency traffic from the least one master unit to the at least one remote antenna unit, wherein the base station downlink radio frequency signal at least in part comprises the downlink radio frequency traffic; wherein the first user plane is in communication with a control plane via a network, the first user plane further comprising a high level protocol interface abstraction layer, wherein the control plane communicates to the first user plane, via the high level protocol interface abstraction layer, non-hardware specific commands and data that configure operation of the first user plane, wherein the first user plane processes and forwards the uplink and downlink radio frequency traffic based on configuration commands received from the control plane.

Example 2 includes the system of example 1, wherein the network is communicatively coupled with a DAS cloud computing network comprising at least one network node, wherein the control plane comprises one or more control plane applications executed by the at least one network node of the DAS cloud computing network.

Example 3 includes the system of example 2, wherein the DAS cloud computing network further comprises a data plane in communication with the control plane, the data plane comprising at least network node that includes a shared database.

Example 4 includes the system of any of examples 2-3, wherein the control plane comprises DAS Control Plane Services dedicated to controlling the first user plane.

Example 5 includes the system of any of examples 1-4, wherein the first user plane is logically divided into a plurality of multiple logical user planes, wherein each of the multiple logical user planes process and forward the uplink and downlink radio frequency traffic based on independent configurations received from the control plane.

Example 6 includes the system of any of examples 1-5, further comprising: at least a second user plane, wherein the second user plane is in communication with the control plane via the network, the second user plane further comprising a high level protocol interface abstraction layer, wherein the control plane sends non-hardware specific commands and data that configure operation of the second user plane, wherein the second user plane processes and forwards a second uplink radio frequency traffic and second downlink radio frequency traffic based on configuration commands received from the control plane.

Example 7 includes the system of any of examples 1-6, wherein the first user plane is combined with another user plane of another distributed antenna system to form a logical user plane, wherein the control plane sends non-hardware specific commands and data that configure operation of the logical user plane.

Example 8 includes the system of any of examples 1-7, wherein the first user plane transmits alarms to the control plane over the network using the high level protocol interface abstraction layer.

Example 9 includes the system of any of examples 1-8, wherein in response to the configuration commands received from the control plane, the first user plane adjusts RF signal levels of one or both of the uplink radio frequency traffic and the downlink radio frequency traffic.

Example 10 includes the system of any of examples 1-9, wherein a high level protocol interface abstraction layer translates configuration commands received from the control plane into DAS hardware specific instructions compatible with the uplink circuitry and downlink circuitry.

Example 11 includes the system of any of examples 1-10, wherein the first user plane transports one or both of analog uplink and downlink radio frequency traffic signals or digital uplink and downlink radio frequency traffic signals.

Example 12 includes a distributed antenna system (DAS) architecture, the DAS architecture comprising: a DAS cloud computing network; a first distributed antenna system comprising at least a first user plane, wherein the first user plane includes uplink circuitry and downlink circuitry, wherein the uplink circuitry forwards uplink radio frequency traffic from at least one remote antenna unit of the first distributed antenna system to at least one master unit of the first distributed antenna system, wherein the downlink circuitry forwards downlink radio frequency traffic from the least one master unit to the at least one remote antenna unit; wherein the DAS cloud computing network comprises a control plane in communication with the first user plane of the first distributed antenna system through a network; wherein the first user plane comprises a high level protocol interface abstraction layer coupled to the network and processes and forwards the uplink and downlink radio frequency traffic based on configuration commands received from the control plane via the high level protocol interface abstraction layer.

Example 13 includes the DAS architecture of example 12, wherein a high level protocol interface abstraction layer translates configuration commands received from the control plane into DAS hardware specific instructions compatible with the uplink circuitry and downlink circuitry.

Example 14 includes the DAS architecture of any of examples 12-13, wherein the control plane comprises one or more control plane applications executed by at least one network node of the DAS cloud computing network, wherein the configuration commands to the first user plane are generated by the one or more control plane applications.

Example 15 includes the DAS architecture of any of examples 12-14, wherein the control plane comprises a plurality of virtual machines executed by at least one network node of the DAS cloud computing network, wherein the configuration commands to the first user plane are generated by the plurality of virtual machines.

Example 16 includes the DAS architecture of any of examples 12-15, wherein the DAS cloud computing network further comprises a data plane in communication with the control plane, the data plane comprising at least one network node or a database virtual machine that includes a shared database.

Example 17 includes the DAS architecture of any of examples 12-16, wherein the DAS cloud computing network further comprises: a plurality of virtual machines; a data plane comprising a shared database; a message and data bus, wherein the plurality of virtual machines and the shared database are communicatively coupled to each other over the message and data bus; wherein the plurality of virtual machines comprises at least one DAS Controller Virtual Machine associated with the first user plane, wherein the at least one DAS Controller Virtual Machine is communicatively coupled to the first user plane via the high level protocol interface abstraction layer.

Example 18 includes the DAS architecture of example 17, wherein the DAS cloud computing network further comprises a web backend server coupled to the message and data bus, wherein the web backend server serves web pages providing a common user interface to access applications provided by each of the plurality of virtual machines.

Example 19 includes the DAS architecture of any of examples 17-18, wherein the plurality of virtual machines further comprises a system configuration virtual machine, wherein the system configuration virtual machine manages configuration of the DAS cloud computing network.

Example 20 includes the DAS architecture of any of examples 17-19, wherein the plurality of virtual machines further comprises a network element management virtual machine that includes a northbound interface to an operations and maintenance service.

Example 21 includes the DAS architecture of any of examples 17-20, wherein the plurality of virtual machines has common access to the shared database.

Example 22 includes the DAS architecture of any of examples 17-21, wherein the plurality of virtual machines comprises a second DAS Controller Virtual Machine associated with a second user plane, wherein the second DAS Controller Virtual Machine is communicatively coupled to the second user plane via the high level protocol interface abstraction layer.

Example 23 includes the DAS architecture of example 22, wherein the second user plane is an element of the first distributed antenna system.

Example 24 includes the DAS architecture of any of examples 22-23, further comprising a second distributed antenna system that comprises the second user plane.

Example 25 includes the DAS architecture of any of examples 12-24, wherein the DAS cloud computing network further comprises: a plurality of DAS cloud service applications executed by one or more network nodes of the DAS cloud computing network; a data plane comprising a shared database; a message and data bus, wherein the plurality of DAS cloud service applications and the shared database are communicatively coupled to each other over the message and data bus.

Example 26 includes the DAS architecture of example 25, wherein the plurality of DAS cloud service applications comprises an operations and maintenance service in communication with the first user plane, wherein the operations and maintenance service is communicatively coupled to the first user plane via control plane and the high level protocol interface abstraction layer; wherein the plurality of DAS cloud service applications further comprises a network configuration service in communication with the first user plane, wherein the network configuration service is communicatively coupled to the first user plane via the control plane and the high level protocol interface abstraction layer; wherein the plurality of DAS cloud service applications further comprises a Web backend service in communication with the first user plane, wherein the Web backend service is communicatively coupled to the first user plane via the control plane and the high level protocol interface abstraction layer.

Example 27 includes the DAS architecture of any of examples 25-26, wherein the DAS cloud service applications have common access to the shared database.

Example 28 includes the DAS architecture of any of examples 25-27, wherein the operations and maintenance service includes a northbound interface.

Example 29 includes the DAS architecture of any of examples 17-28, wherein the DAS cloud computing network further comprises a web backend server coupled to the message and data bus, wherein the web backend server serves web pages providing a common user interface to access applications provided by each of the DAS cloud service applications.

Example 30 includes the DAS architecture of any of examples 17-29, further comprising a second user plane coupled to the DAS cloud computing network over the network, wherein the plurality of DAS cloud service applications are communicatively coupled to the second user plane via a second high level protocol interface abstraction layer.

Example 31 includes the DAS architecture of example 30, wherein the second user plane is an element of the first distributed antenna system.

Example 32 includes the DAS architecture of any of examples 30-31, further comprising a second distributed antenna system that comprises the second user plane.

Example 33 includes the DAS architecture of any of examples 30-32, wherein first user plane and the second user plane are defined within the plurality of DAS cloud service applications as a single logical user plane, wherein the control plane sends non-hardware specific commands and data to the first user plane and the second user plane that configure operation of the logical user plane.

Example 34 includes the DAS architecture of any of examples 12-33, wherein the first user plane is logically divided into a plurality of multiple logical user planes, wherein each of the multiple logical user planes process and forward the uplink and downlink radio frequency traffic based on independent configurations received from the control plane.

Example 35 includes the DAS architecture of any of examples 12-34, wherein the first user plane transmits alarms to the control plane over the network using the high level protocol interface abstraction layer.

Example 36 includes the DAS architecture of any of examples 12-35, wherein in response to the configuration commands received from the control plane, the first user plane adjusts RF signal levels of one or both of the uplink radio frequency traffic and the downlink radio frequency traffic.

Example 37 includes the DAS architecture of any of examples 12-36, wherein the first user plane transports one or both of analog uplink and downlink radio frequency traffic signals or digital uplink and downlink radio frequency traffic signals.

In various alternative embodiments, system and/or device elements, method steps, or example implementations described throughout this disclosure (such as any of the master units, remote antenna units, expansion units, controllers, circuitry, user planes, control planes, data planes, high level protocol interfaces, cloud networks, virtual machines, switches, cloud services, web backend servers or frontend client, or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

It should be appreciated that other network architectures may be implemented that still functionally operate in the same manner as described in any of the embodiments described herein. It should also be understood that for any of the embodiments described herein, while the communication links connecting master units and remote antenna units may comprise optical fiber, in other embodiments other wired or wireless communication links, or combinations thereof, may be utilized instead of, or in combination with, optical fiber communication links.

As used herein, DAS related terms such as "master unit", "remote unit", "remote antenna unit", "expansion unit", "extension unit", "control unit" and "controller" refer to hardware elements that would be immediately recognized and understood by those of skill in the art of wireless communications and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:
1. A distributed antenna system (DAS) architecture, the DAS architecture comprising:
a DAS cloud computing network;
a first distributed antenna system comprising uplink circuitry and downlink circuitry configured to implement at least a first user plane, wherein the uplink circuitry forwards uplink radio frequency traffic from at least one remote antenna unit of the first distributed antenna system to at least one master unit of the first distributed antenna system, wherein the downlink circuitry forwards downlink radio frequency traffic from the least one master unit to the at least one remote antenna unit;
wherein the DAS cloud computing network comprises a control plane in communication with the first user plane of the first distributed antenna system through a network;
wherein the first user plane comprises a protocol interface abstraction layer coupled to the network and is communicatively coupled to the control plane through the network by the protocol interface abstraction layer of the first user plane, wherein a protocol interface abstraction layer translates configuration commands received from the control plane into DAS hardware specific instructions compatible with the uplink circuitry and downlink circuitry, and wherein the first user plane processes and forwards the uplink and downlink radio frequency traffic based on configuration commands received from the control plane via the protocol interface abstraction layer.

2. The DAS architecture of claim 1, wherein the control plane comprises one or more control plane applications executed by at least one network node of the DAS cloud computing network, wherein the configuration commands to the first user plane are generated by the one or more control plane applications.

3. The DAS architecture of claim 1, wherein the control plane comprises a plurality of virtual machines executed by at least one network node of the DAS cloud computing network, wherein the configuration commands to the first user plane are generated by the plurality of virtual machines.

4. The DAS architecture of claim 1, wherein the DAS cloud computing network further comprises a data plane in communication with the control plane, the data plane comprising at least one network node or a database virtual machine that includes a shared database.

5. The DAS architecture of claim 1, wherein the DAS cloud computing network further comprises:
 a plurality of virtual machines;
 a data plane comprising a shared database;
 a message and data bus, wherein the plurality of virtual machines and the shared database are communicatively coupled to each other over the message and data bus;
 wherein the plurality of virtual machines comprises at least one DAS Controller Virtual Machine associated with the first user plane, wherein the at least one DAS Controller Virtual Machine is communicatively coupled to the first user plane via the protocol interface abstraction layer.

6. The DAS architecture of claim 5, wherein the DAS cloud computing network further comprises a web backend server coupled to the message and data bus, wherein the web backend server serves web pages providing a common user interface to access applications provided by each of the plurality of virtual machines.

7. The DAS architecture of claim 5, wherein the plurality of virtual machines further comprises a system configuration virtual machine, wherein the system configuration virtual machine manages configuration of the DAS cloud computing network.

8. The DAS architecture of claim 5, wherein the plurality of virtual machines further comprises a network element management virtual machine that includes a northbound interface to an operations and maintenance service.

9. The DAS architecture of claim 5, wherein the plurality of virtual machines has common access to the shared database.

10. The DAS architecture of claim 5, wherein the plurality of virtual machines comprises a second DAS Controller Virtual Machine associated with a second user plane, wherein the second DAS Controller Virtual Machine is communicatively coupled to the second user plane via the protocol interface abstraction layer.

11. The DAS architecture of claim 10, wherein the second user plane is an element of the first distributed antenna system.

12. The DAS architecture of claim 10, further comprising a second distributed antenna system that comprises the second user plane.

13. The DAS architecture of claim 1, wherein the DAS cloud computing network further comprises:
 a plurality of DAS cloud service applications executed by one or more network nodes of the DAS cloud computing network;
 a data plane comprising a shared database;
 a message and data bus, wherein the plurality of DAS cloud service applications and the shared database are communicatively coupled to each other over the message and data bus.

14. The DAS architecture of claim 13, wherein the plurality of DAS cloud service applications comprises an operations and maintenance service in communication with the first user plane, wherein the operations and maintenance service is communicatively coupled to the first user plane via control plane and the protocol interface abstraction layer;
 wherein the plurality of DAS cloud service applications further comprises a network configuration service in communication with the first user plane, wherein the network configuration service is communicatively coupled to the first user plane via the control plane and the protocol interface abstraction layer;
 wherein the plurality of DAS cloud service applications further comprises a Web backend service in communication with the first user plane, wherein the Web backend service is communicatively coupled to the first user plane via the control plane and the protocol interface abstraction layer.

15. The DAS architecture of claim 13, wherein the DAS cloud service applications have common access to the shared database.

16. The DAS architecture of claim 13, wherein the operations and maintenance service includes a northbound interface.

17. The DAS architecture of claim 5, wherein the DAS cloud computing network further comprises a web backend server coupled to the message and data bus, wherein the web backend server serves web pages providing a common user interface to access applications provided by each of the DAS cloud service applications.

18. The DAS architecture of claim 5, further comprising a second user plane coupled to the DAS cloud computing network over the network, wherein the plurality of DAS cloud service applications are communicatively coupled to the second user plane via a second protocol interface abstraction layer.

19. The DAS architecture of claim 18, wherein the second user plane is an element of the first distributed antenna system.

20. The DAS architecture of claim 18, further comprising a second distributed antenna system that comprises the second user plane.

21. The DAS architecture of claim 18, wherein first user plane and the second user plane are defined within the plurality of DAS cloud service applications as a single logical user plane, wherein the control plane sends non-hardware specific commands and data to the first user plane and the second user plane that configure operation of the logical user plane.

22. The DAS architecture of claim 1, wherein the first user plane is logically divided into a plurality of multiple logical user planes, wherein each of the multiple logical user planes process and forward the uplink and downlink radio frequency traffic based on independent configurations received from the control plane.

23. The DAS architecture of claim 1, wherein the first user plane transmits alarms to the control plane over the network using the protocol interface abstraction layer.

24. The DAS architecture of claim 1, wherein in response to the configuration commands received from the control plane, the first user plane adjusts RF signal levels of one or both of the uplink radio frequency traffic and the downlink radio frequency traffic.

25. The DAS architecture of claim 1, wherein the first user plane transports one or both of analog uplink and downlink radio frequency traffic signals or digital uplink and downlink radio frequency traffic signals.

\* \* \* \* \*